Figure 1:
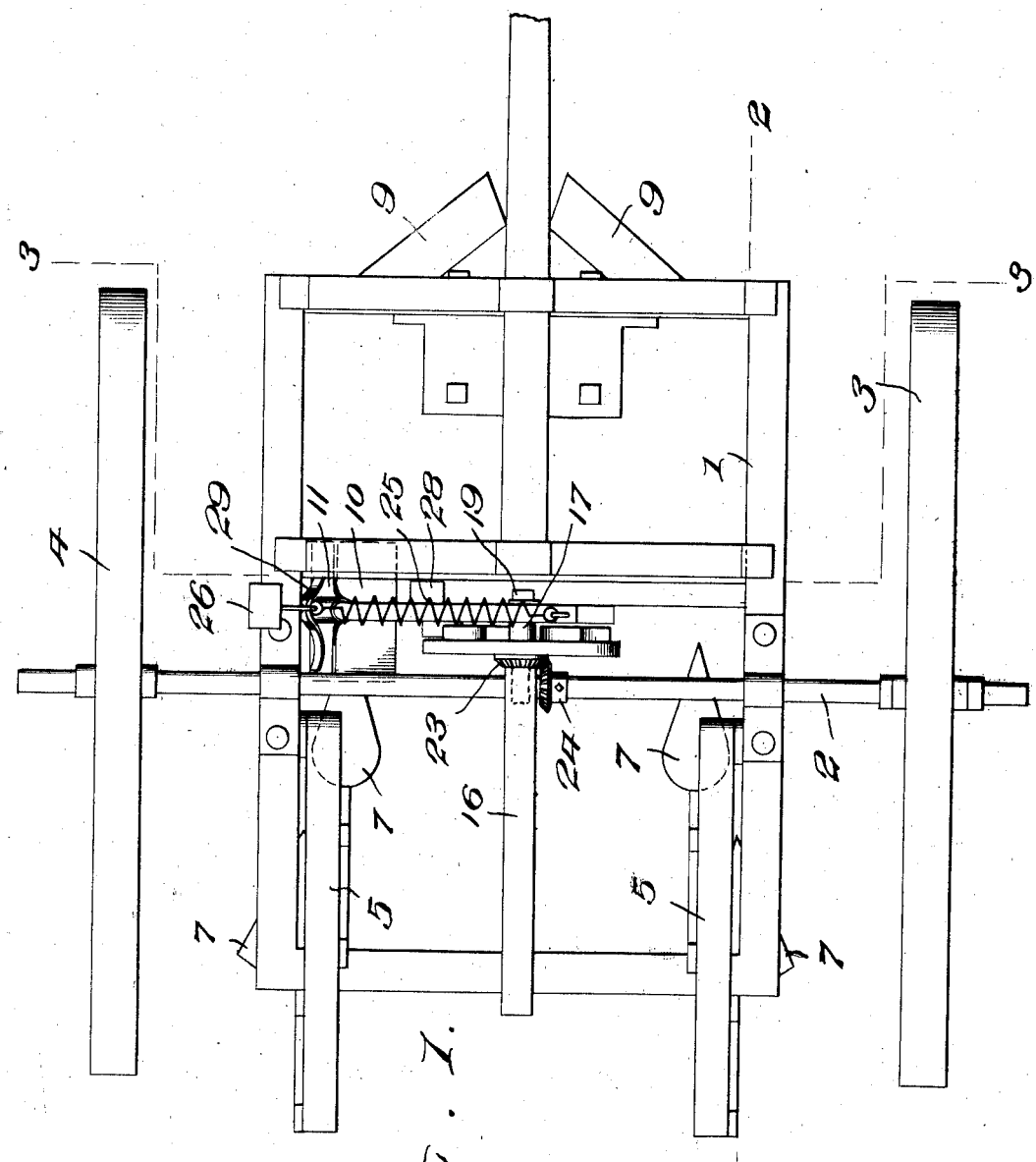

No. 882,971. PATENTED MAR. 24, 1908.
G. W. SHARP.
COMBINED COTTON CHOPPER AND CULTIVATOR.
APPLICATION FILED OCT. 14, 1907.

3 SHEETS—SHEET 1.

WITNESSES:

INVENTOR
G. W. Sharp
BY
W. J. Fitzgerald & Co.
Attorneys

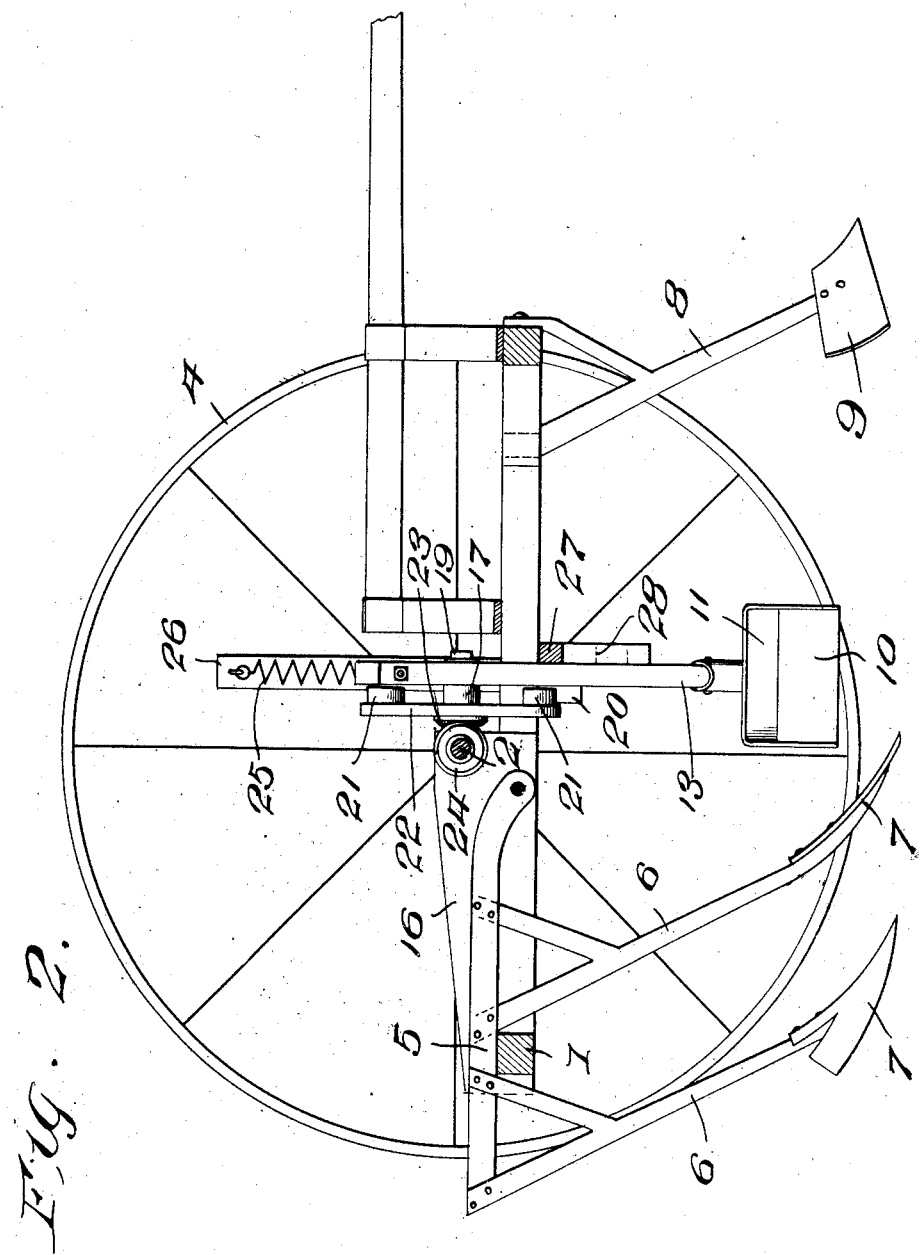

No. 882,971. PATENTED MAR. 24, 1908.
G. W. SHARP.
COMBINED COTTON CHOPPER AND CULTIVATOR.
APPLICATION FILED OCT. 14, 1907.
3 SHEETS—SHEET 3.
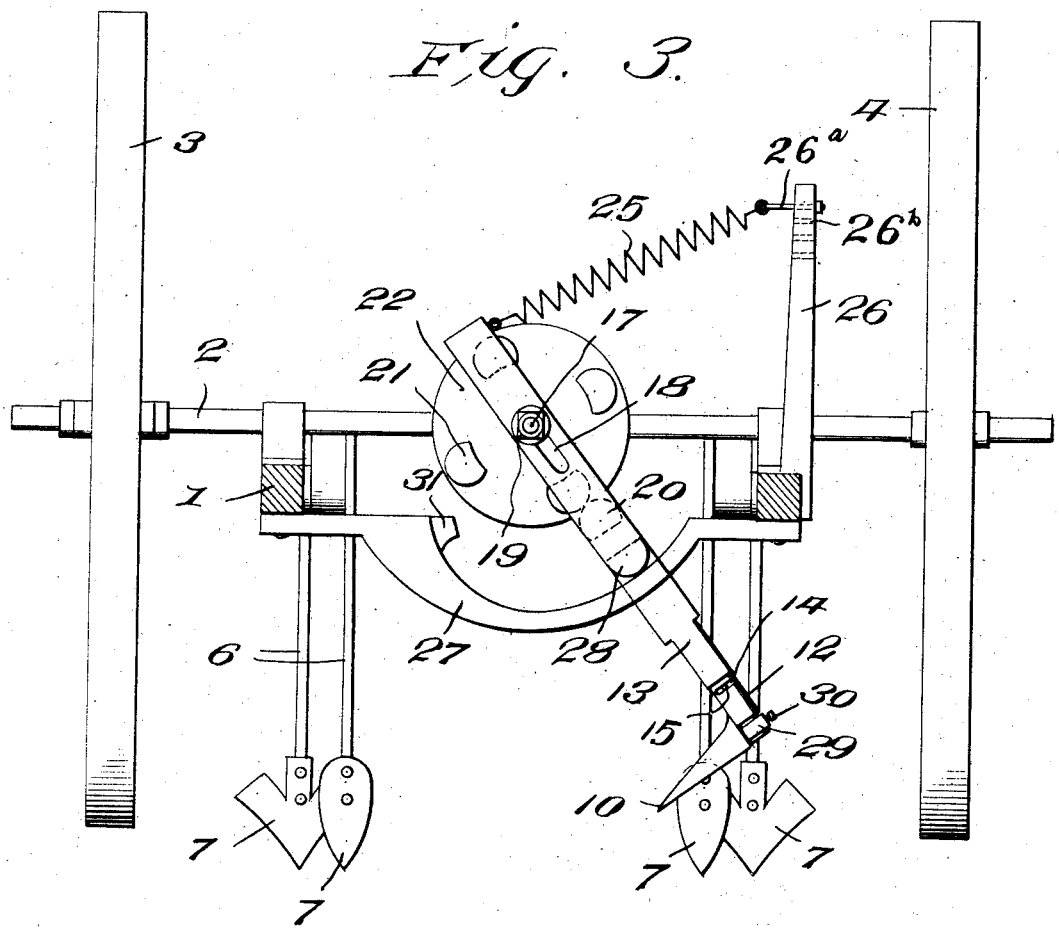
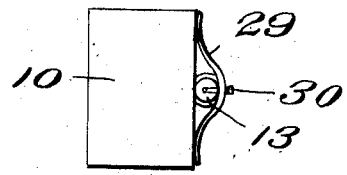
WITNESSES:
INVENTOR
G. W. Sharp
BY
W. J. Fitzgerald & Co.
Attorneys

UNITED STATES PATENT OFFICE.

GEORGE WASHINGTON SHARP, OF BAUM, OKLAHOMA.

COMBINED COTTON CHOPPER AND CULTIVATOR.

No. 882,971.　　　　Specification of Letters Patent.　　Patented March 24, 1908.

Application filed October 14, 1907. Serial No. 397,423.

*To all whom it may concern:*

Be it known that I, GEORGE WASHINGTON SHARP, a citizen of the United States, residing at Baum, in the county of Chickasaw, Oklahoma, have invented certain new and useful Improvements in a Combined Cotton Chopper and Cultivator; and I do hereby declare the following to be a full, clear, and exact description of the invention, such as will enable others skilled in the art to which it appertains to make and use the same.

My invention relates to new and useful improvements in combined cotton choppers and cultivators and my object is to provide means in connection with the cultivator for removing portions of the growing plants.

A further object is to provide means for intermittently moving the chopping blade across the row of growing plants.

A still further object is to provide means for elevating the blade above the row of plants on its return stroke, and a still further object is to provide means for operating the chopping blade.

Other objects and advantages will be hereinafter referred to and more particularly pointed out in the claims.

In the accompanying drawings which are made a part of this application, Figure 1 is a top plan view of my improved cotton chopper and cultivator. Fig. 2 is a sectional view as seen on line 2—2, Fig. 1. Fig. 3 is a sectional view as seen on line 3—3, Fig. 1, and, Fig. 4 is a bottom plan view of the chopping blade and parts supporting the same.

Referring to the drawings in which similar reference numerals designate corresponding parts throughout the several views, 1 indicates a frame, which may be of the usual or any preferred form, said frame being secured to an axle 2, to the opposite ends of which are secured supporting wheels 3 and 4.

Pivotally secured to the side bars of the frame 1 are beams 5, said beams extending rearwardly and over the rear bar of the frame 1 and have secured thereto depending shank 6, to the lower end of which are secured the usual or any preferred form of cultivator shovels 7, by which means the soil between the rows of growing plants is cultivated. The forward end of the frame 1 is also provided with depending shanks 8, to the lower ends of which are secured shovels 9, by which means the soil adjacent the growing plants is cultivated.

In order to remove superfluous plants from the row and leave the growing plants substantially an equal distance apart, I provide my improved form of chopping blade 10, the rear edge and ends of which are provided with upwardly extending flanges 11, while to the rear flange is secured a socket 12, to receive the lower end of an operating arm 13, said socket being removably secured to the arm by providing an elongated slot 14 in the socket 12 and introducing a pin 15 through the slot and into the arm 13, thereby removably securing the blade to the arm and in such manner as to allow swinging motion thereof on the arm.

Extending forwardly from the rear bar of the frame 1, and in position to receive at its forward end, the axle 2, is a bar 16, said bar extending a distance above the axle 2 and has secured to its forward end, a stub shaft 17, on the rear end of which is mounted the arm 13, said arm being provided with a longitudinally disposed slot 18, through which the stub shaft 7 enters and the arm is held in position on the shaft by means of a nut 19, or in any other preferred manner.

In order to swing the arm laterally across the row of growing plants as the cultivator is moving forwardly, that portion of the arm 13 below the slot 18 is provided with a lug 20, with which is adapted to engage a plurality of auxiliary lugs 21 on the outer face of a disk 22, the meeting faces of said lugs being curved, so that the friction therebetween will be reduced when the arm 13 is being operated by the disk. The disk 22 is rotatably mounted on the stub shaft 17 and between the end of the bar 16 and the arm 13 and has fixed thereto a bevel pinion 23, which meshes with a driving pinion 24 on the axle 2, and it will be seen that as the axle 2 rotates, the disk 22 will be likewise rotated and the lugs 21 successively moved into engagement with the lug 20 on the arm 13 and the lugs on the disk and the lug on the arm are so situated, that the blade at the lower end of the arm will be moved a distance to one side or to the left of the row of growing plants and when the lower end of the arm has moved a certain distance to the left, the lug 20 will move out of the path of the lug 21, with which it is engaged, whereupon a spring 25, attached to the upper end of the arm 13, will quickly swing the arm on the stub-shaft 17 and move the cutting blade 10 through the row of growing plants and to the opposite side of the row, the opposite end of the spring 25 being adjustably secured to a standard 26 on the frame 1, by securing the spring to a bolt 26$^a$, which bolt is adapted to be introduced through openings 26$^b$ in the standard, whereby the tension of the spring may be increased or decreased, as desired.

Extending from side to side of the frame 1 and in front of the arm 13, is a guide 27, the central portion of which is curved downwardly to form a track-way for a semi-circular lug 28 on the arm 13, the upper, curved surface of the guide 27 being eccentric to the stub-shaft 17, so that when the arm is swung to direct the blade through the row of plants, the arm will be moved upwardly the full length of the slot 18, thereby supporting the blade above the row of growing plants and directly in the path of the next succeeding auxiliary lug, the tension of the spring 25 holding the arm in its elevated position, until the arm has made its return stroke, when the pressure on the lug 20 by the auxiliary lug 21 will again lower the arm 13 until the lug 20 passes below the auxiliary lug 21, when the spring 25 will again swing the blade across the row of growing plants.

In order to allow the blade 10 to partially rotate on the arm 13, as when one end thereof engages a solid object, and, at the same time, normally hold the blade in its operative position, a spring 29 is secured to the lower end of the arm 13 and below the socket 12, the ends of the spring being curved inwardly and adapted to rest against the flange 11 at the rear edge of the blade, said spring being secured to the arm in any suitable manner, as by directing a bolt 30 through the spring and into the arm.

In order to positively drive the axle 2 and cause the chopping device to operate, the wheel 3 is fixed to the shaft 2 in any suitable manner, while the wheel 4 is rotatably mounted on the shaft, so that the cultivator may be readily turned or guided, as desired. The arm 13 when moved across the row of plants is brought violently into engagement with a stop 31 on the curved face of the guide 27, the impact throwing the dirt from the blade 10.

It will thus be seen that I have provided a very cheap and economical form of combined cultivator and chopper and one that will positively operate to remove a superfluous number of the growing plants, and it will further be seen that by yieldingly mounting the blade as shown and described, said blade will not become broken when directed into engagement with a solid object and it will also be seen that said blade can be readily removed and a new blade inserted in its place, when desired.

What I claim is:

1. The herein described combined cotton chopper and cultivator, comprising the combination with a frame; of an axle rotatably mounted on said frame, wheels on said axles, a disk, pinions on said disk and axles, to rotate the disk, an arm pivotally mounted adjacent said disk, a lug on said arm, a plurality of auxiliary lugs on said disk, adapted to engage said lug on the arm and oscillate said arm, a blade yieldingly mounted at the lower end of said arm and means to quickly return the arm and blade to their initial positions when the lug on the arm is released from the lug on the disk.

2. A cotton chopper of the class described, comprising the combination with a frame, an axle on said frame and wheels on said axle; of a stub shaft carried by said frame, a disk rotatably mounted on said shaft, coöperating pinions on said disk and axle, adapted to rotate the disk, an arm pivotally and longitudinally movably mounted on the outer end of the stub-shaft, a lug on said arm, means on said disk to successively engage said lug and move the lower end of the arm to one side of the longitudinal center of the frame, means at the upper end of the arm to return the lower end of the arm to its initial position, when the lug on the arm is released, means to move said arm longitudinally on the stub shaft and a blade yieldingly mounted on the lower end of said arm.

3. The herein described cotton chopper, comprising the combination with a frame, an axle rotatably mounted on said frame and supporting wheels for said axle, one of said wheels being fixed to the axle; of a stub shaft carried by said frame, an arm pivotally and longitudinally movably mounted on said shaft, a blade for the lower end of said arm, a socket having a horizontally disposed slot therein, means extending through said slot and into the arm to hold the blade and socket in position on the arm, a spring carried by the arm, adapted to direct pressure on the rear edge of the blade and normally hold the same in its initial position and means to swing the blade across the path of the growing plants, whereby a portion of said plants will be removed.

4. In a cotton chopper of the class described, the combination with a frame, an axle on said frame and means to rotate said axle; of a stub shaft carried by said frame, a disk rotatably mounted on said stub shaft, pinions on said axle and disk, adapted to rotate the disk, an arm pivotally and longitudinally movably mounted on the stub shaft, means between the disk and arm to rotate said arm in one direction, a spring secured to the upper end of the arm, adapted to rotate the arm in the opposite direction, a standard on said frame, means to adjustably secure the opposite end of the spring to the standard, whereby the tension of the spring may be increased or decreased, a blade yieldingly secured to the lower end of the arm and means to move said arm longitudinally when the same is rotated in one direction.

In testimony whereof I have signed my name to this specification in the presence of two subscribing witnesses.

GEORGE WASHINGTON SHARP.

Witnesses:
  WILLIE MARTIN,
  GEO. WILLIAMS.